United States Patent [19]
Wessels

[11] Patent Number: 5,314,201
[45] Date of Patent: May 24, 1994

[54] LOCKING SYSTEM FOR A SEMITRAILER SLIDING UNDERCARRIAGE

[75] Inventor: Larry L. Wessels, Lakewood, Colo.

[73] Assignee: Rocky Mountain Technology Engineering Corp., Lakewood, Colo.

[21] Appl. No.: 996,580

[22] Filed: Dec. 24, 1992

[51] Int. Cl.$^5$ ............................................. B62D 53/06
[52] U.S. Cl. ............................... 280/407.1; 280/149.2; 180/209
[58] Field of Search ............... 280/149.2, 407.1, 405.1, 280/482, 432, 428; 180/209, 24.02

[56] References Cited

U.S. PATENT DOCUMENTS

| | | | |
|---|---|---|---|
| 3,618,969 | 11/1971 | Glassmeyer | 280/149.2 |
| 3,778,079 | 12/1973 | Vornberger et al. | 280/149.2 |
| 4,286,797 | 9/1981 | Mekosh, Jr. et al. | 280/149.2 |
| 4,353,565 | 10/1982 | Smith et al. | 280/149.2 |
| 4,838,578 | 6/1989 | Baxter | 280/149.2 |
| 4,944,522 | 7/1990 | Hart | 280/149.2 |
| 5,137,296 | 8/1992 | Forman | 280/149.2 |
| 5,199,732 | 4/1993 | Lands et al. | 280/149.2 |
| 5,232,234 | 8/1993 | McCombs | 280/149.2 |

*Primary Examiner*—Margaret A. Focarino
*Assistant Examiner*—Paul Dickson
*Attorney, Agent, or Firm*—Edwin H. Crabtree; Donald W. Margolis

[57] ABSTRACT

A locking system mounted on a semitrailer sliding undercarriage and used for securing and releasing the sliding undercarriage from an underside of a semitrailer. The sliding undercarriage is also known commonly in the trucking industry as a sliding tandem and further referred to as a longitudinally shiftable running gear. The system includes two or more air cylinders mounted on the sliding undercarriage. Each air cylinder is attached to a locking pin which is inserted into locking pin holes disposed along a length of a pair of parallel rails. The rails are mounted on the underside of the semitrailer. The system prevents retraction of the locking pins if the semitrailer brakes have not been set. Further, the system is fail-safe and automatically reinserts the locking pins in the locking pin holes if the power to a control panel is interrupted or air pressure is applied to release the semitrailer's air brakes. The air cylinders have electronic position sensors wired to the control panel. The control panel is mounted on the semitrailer or also in a cab of a tractor used to pull the semitrailer. The position sensors produce a display on the control panel and activate a warning alarm when one or more pins are retracted from the locking pin holes when changing the position of the sliding undercarriage on the semitrailer.

18 Claims, 2 Drawing Sheets

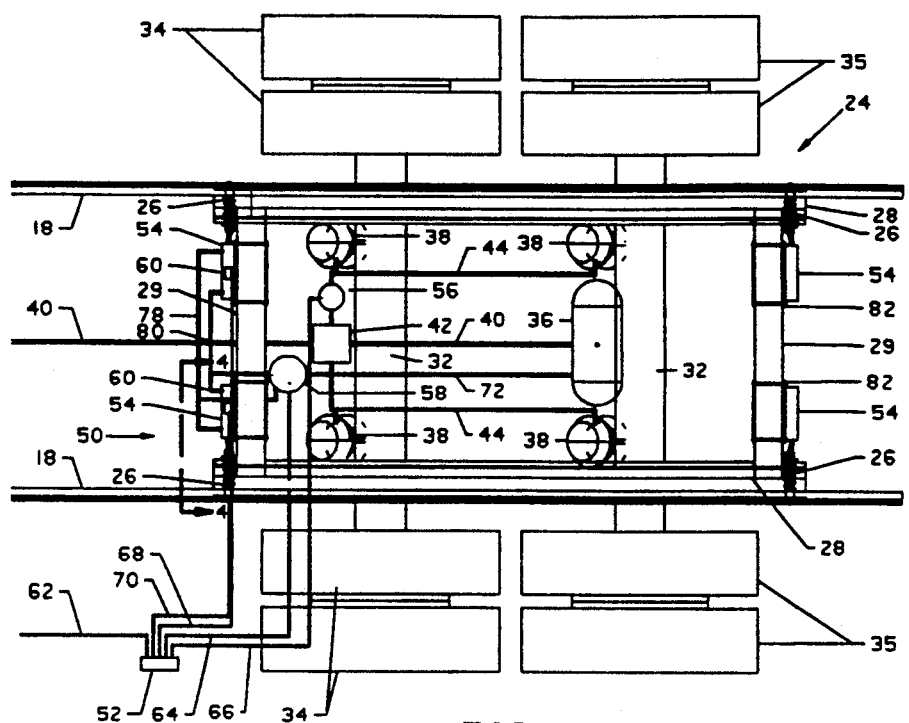
FIG 3
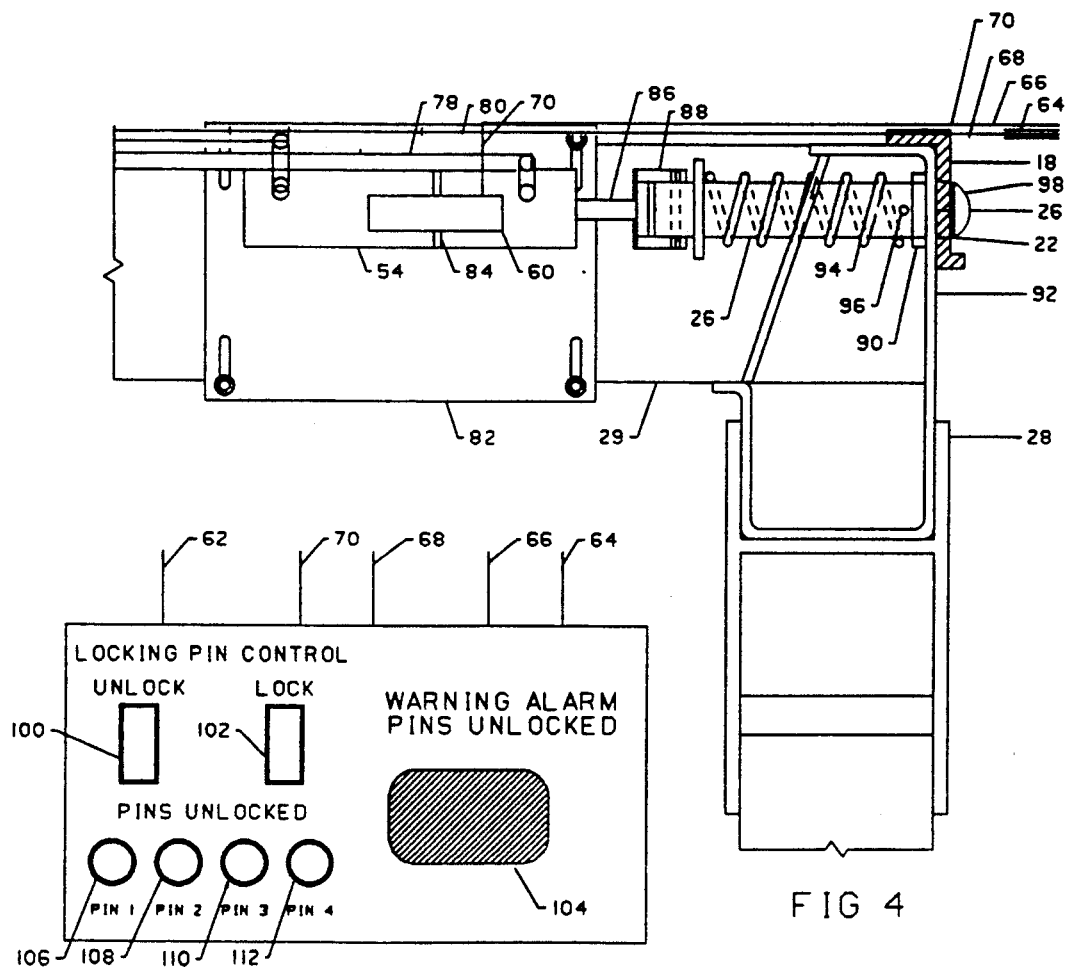
FIG 4
FIG 5

LOCKING SYSTEM FOR A SEMITRAILER SLIDING UNDERCARRIAGE

BACKGROUND OF INVENTION (a) Field of the Invention

This invention relates to a system for securing a sliding undercarriage to a semitrailer and more particularly, but not by way of limitation, to a fail-safe system used with a sliding undercarriage for securing the undercarriage to a pair of parallel rails on the underside of a semitrailer.

(b) Discussion of Prior Art

A common truck transportation system in the United States is a tractor pulling a semitrailer. The tractor has an engine, transmission, steerable front axle with wheels and one or more rear drive axles and wheels. The tractor is attached to a semitrailer through a fifth wheel which is located over the tractor's rear drive axle. The semitrailer rides on a running gear or called herein a "sliding undercarriage". The sliding undercarriage includes a suspension, one or more unpowered axles, wheels, a pneumatic brake system and a locking pin release system. The sliding undercarriage is slidable along a portion of the length of the underside of the semitrailer.

Today, federal and state laws define weight limits per axle for tractors and semitrailers. Fines are imposed at each state port-of-entry if load limits are exceeded. By shifting the sliding undercarriage under the semitrailer, the driver can improve the balance of load between the tractor and the semitrailer to meet highway axle weight limit requirements. Also, to improve maneuverability on city streets, the sliding undercarriage can be shifted toward the tractor to shorten the unit's turning radius.

The sliding undercarriage is typically locked between two parallel rails that are integral to the structure of the bottom frame of the semitrailer. Lateral movement relative to the semitrailer is limited to the clearance between the two rails and the sliding undercarriage frame. The sliding undercarriage can be moved longitudinally, generally five to seven feet, under the semitrailer by sliding along and between the two rails. The sliding undercarriage is locked to the semitrailer rails by a system of usually two or four steel pins that are part of the sliding undercarriage frame. The pins are aligned in opposing pairs in the sliding undercarriage structure and in a locked position project outward through locking pin holes in the rails. The locking pin holes are generally spaced three to six inches apart along the rails. The locking pins are usually spring loaded to retain them in a locked position during highway travel. The locking pins are retracted and reinserted in the locking pin holes using a manually operated locking pin release system.

Semitrailers are commonly equipped with pneumatic spring brake systems which typically operate at 90–120 psi. The spring loaded air brakes are automatically set by the springs when air pressure is removed through a control in the tractor which vents the supply air line and spring brake air lines to the atmosphere. To release the air brakes, air pressure from the tractor compressor is routed through the supply air line and a relay valve to apply pressure from the air supply tank to overcome the brake spring bias force.

The most common way to reposition the sliding undercarriage under the semitrailer is through a process of trial and error. The driver locks the brakes on both the tractor and semitrailer. The driver then climbs out of the tractor, walks to the sliding undercarriage, and pulls or lifts the manually operated locking pin release lever which is usually positioned immediately ahead of or between the left wheels of the sliding undercarriage. Most Original Equipment Manufacturer (OEM) manually operated locking pin release systems are a mechanical apparatus designed to rotate when the locking pin release lever is pulled or lifted. The pins are retracted by a pulling or a lifting force transmitted through a series of linkages designed to provide a mechanical advantage to overcome the spring loaded locking pin retention force. The pin release apparatus usually includes provisions to hold the lever and locking pins in the retracted position while the driver returns to the tractor. The driver then releases the brakes on the tractor while leaving the brakes applied on the semitrailer's sliding undercarriage. The tractor is then driven forward or backward to slide the semitrailer relative to the sliding undercarriage. The driver, after sliding the semitrailer the distance considered correct, then reapplies the tractor brakes. The driver again leaves the tractor, walks back to the sliding undercarriage, and releases or pushes down the pin release lever. The spring loaded locking pins are usually not perfectly aligned to reinsert through locking holes. Each locking pin, when not fully reinserted, is pressed by the locking pin retaining spring against the rail at a location between two locking pin holes. The driver returns to the tractor, releases the tractor brakes, and moves the semitrailer only a few inches or less as required for the spring loaded pins to drop into the first holes in the rails that move into alignment. The driver must then reapply the brakes and walk around the semitrailer to visually verify that all pins are in locked positions. The driver then secures the locking pin release lever to the sliding undercarriage for highway travel.

The process of retracting the locking pins and sliding the bottom side of the semitrailer over the sliding undercarriage is more easily completed with the assistance of a second person. The second person pulls or lifts the locking pin release lever and assists the driver in repositioning the sliding undercarriage under the semitrailer. The manually operated pin retraction systems can become impossible to operate due to damage or corrosion of the linkage and contamination with dirt and ice from exposure under the semitrailer. Locking pins can also become stuck in the holes in the rails if the semitrailer is parked on an incline or positioned with a slight twist in the frame. Pins are often loosened only by pounding them out with hammers. The usual procedure to loosen stuck locking pins is to apply the brakes on the sliding undercarriage and rock the semitrailer by repeatedly driving the tractor forward and backward a few inches. The assistant provides a constant pull on the pin release lever to apply the maximum force possible to overcome the locking pin springs and withdraw the pins if they become loose. Similar problems are often encountered in trying to reinsert locking pins. Extra force and assistance to align individual pins may be required to reinsert locking pins into new locking holes after the sliding undercarriage has been repositioned. The locking pin linkage can be damaged, bent, or twisted during attempts to loosen stuck pins. Distorted linkage may limit the distance that locking pins can be reinserted and make it impossible to reinsert pins into locked positions. The assistant positioned under the semitrailer near the wheels during attempts to loosen stuck locking pins or reinsert pins can be seriously injured. Bad weather such as rain, ice, and snow increase the probability of injury to an assistant positioned near the sliding undercarriage wheels. Fatalities related to attempts to retract and reinsert the locking pins have been reported.

The Department of Transportation highway port-of-entry weigh stations and routine highway safety inspections include verification per 49 CFR 393.207(b) that all locking pins are properly inserted. Fines may be imposed and vehicles designated out-of-service until maintenance is completed. According to this federal agency, highway accidents have been caused by locking pins not being properly inserted for securing the sliding undercarriage to the semitrailer rails.

The problems inherent in retracting and inserting locking pins with the above mentioned manually operated pin retraction apparatus have been recognized in U.S. Pat. No. 4,944,522 to Hart, U.S Pat. No. 4,838,578 to Baxter, U.S. Pat. No. 4,353,565 to Smith et al., U.S. Pat. No. 4,286,797 to Mekosh et al., U.S. Pat. No. 3,778,079 to Vornberger and U.S. Pat. No. 3,618,969 to Glassmeyer.

The above mentioned patents to Hart and Baxter provide means to modify the manually operated pin retraction apparatus. The modified systems as described do not provide sufficient force to retract stuck locking pins, especially when complicated by corrosion, damage or contamination. Also, the flexibility of the modified linkage described in these patents is an inefficient means to reinsert locking pins into the locking pin holes. Also, bent linkage may actually prevent the locking pins from being fully inserted into locked positions even when the control lever position indicates that all pins are locked.

In the patents to Smith et al. and to Mekosh et al. complex electromechanical and pneumatic systems are disclosed that require extensive structural modifications to the semitrailer and possibly to the tractor. The patent to Smith et al. describes a few of the features incorporated into the novel system described herein, but the Smith et al. disclosure, for example, does not include a fail-safe system wherein a pressure transducer provides control to automatically reinsert the locking pins should a semitrailer's spring brakes be released when the locking pins are retracted. Also, the fail-safe system prevents the locking pins from being retracted unless the driver sets the semitrailer brakes before adjusting the sliding undercarriage on the semitrailer.

It is important to note that Department of Transportation Motor Carrier Safety Regulation 49 CFR 393.207(b) addresses the unsafe practice of entering highways with locking pins not inserted into the semitrailer's locking pin holes. This is an out-of-service violation per 49 CFR Chapter III, Subpart G, Appendix A to Part 386, and provides fines per violation up to $1,000 to a driver and $10,000 to a motor carrier. This regulation is enforced by each state, i.e., Colorado Revised Statute 42-4-234(1)(A) as amended and enforced by the Department of Public Safety Motor Carrier Safety Unit, Colorado State Patrol. The fail-safe elements of the subject system as described herein assists drivers and motor carriers in complying with the above federal and state regulations. Also, none of the above mentioned patents disclosed the unique fail-safe features and advantages of the subject locking system as described herein for improved efficiency and safety in the adjustment of the sliding undercarriage on the underside of a semitrailer.

SUMMARY OF THE INVENTION

In view of the foregoing, it is a primary object of the invention to provide a truck driver and truck owner the benefit of a reliable and fail-safe system which can easily reposition a sliding undercarriage on a semitrailer without potential injury to the driver or assistant. Also, over axle weight and out-of-service violations will decrease as a result of the simplified sliding undercarriage repositioning procedure.

Another object of the present invention is to provide a system wherein each locking pin is independently retracted and inserted by a double acting air cylinder. The system is designed to transmit adequate force, i.e. over 150 pounds, directly to each locking pin and reliably retract pins stuck in a semitrailer's locking pin holes.

A further object of the fail-safe locking system is the locking pins can only be retracted when the pressure in the semitrailer's spring brake chambers is vented to apply the spring brakes on the semitrailer. If the spring brakes on the semitrailer have not been set, the control panel of the system will not operate the electric air valve and actuate the air cylinders to retract the locking pins.

Another object of the new system is the double acting air cylinders provide insertion force greater than and in addition to locking pin springs used to retain each locking pin in a locked position in the semitrailer rails during highway travel.

Still another object of the invention is the system does not affect the operation of the tractor or semitrailer's electrical or pneumatic system. Specifically, the operation of the semitrailer's pneumatic spring brake system is not affected by the system's elements, unlike some prior art systems.

Yet another object of the invention is the simplicity and low cost of the locking system. Also, the installed cost of the system is comparable to the standard manually operated pin removal mechanism currently used on semitrailers. Further, the system can easily be installed as original equipment on the semitrailer's sliding undercarriage or retrofited on semitrailers already in use.

A further object of the invention is to eliminate the use of unsafe and difficult to use manually operated pin removal linkage mechanisms which are currently standard equipment on semitrailers.

The locking system includes two or more air cylinders mounted on the sliding undercarriage. Each air cylinder is attached to a locking pin which is inserted into locking pin holes disposed along a length of a pair of parallel rails. The rails are mounted on the underside of the semitrailer. The system prevents retraction of the locking pins if the semitrailer brakes have not been set. Further, the system is fail-safe and automatically reinserts the locking pins in the locking pin holes if the power to a control panel is interrupted or air pressure is applied to release the semitrailer's air brakes. The air cylinders have electronic position sensors electrically connected to the control panel. The control panel is mounted on the semitrailer or also in a cab of a tractor used to pull the semitrailer. The position sensors produce a display on the control panel and activate a warning alarm when one or more pins are retracted from the locking pin holes when changing the position of the sliding undercarriage on the semitrailer.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 3 is a top view of the sliding undercarriage with the subject locking system mounted thereon.

FIG. 4 is an enlarged front view of a locking pin and air cylinder with the locking pin received in a locking pin hole in one of the semitrailer's parallel rails. This view is taken along lines 4—4 shown in FIG. 3.

FIG. 5 is a front view of a control panel mounted on the side of the semitrailer or in the cab of the tractor.

DESCRIPTION OF THE PREFERRED EMBODIMENTS

Figure 1:
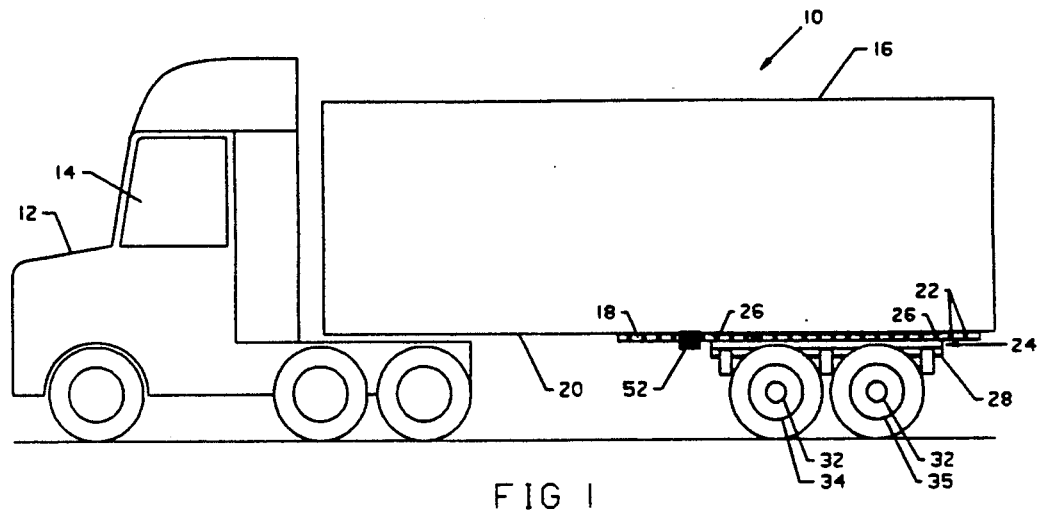
FIG. 1 is a side view of a typical highway tractor and semitrailer with a longitudinally sliding undercarriage mounted on the underside of the rear of the semitrailer.

In FIG. 1 a side view of a typical highway truck is shown having a general reference numeral 10. The truck 10 includes a tractor 12 with cab 14 with the tractor 12 pulling a semitrailer 16. The semitrailer 16 has a pair of parallel rails 18 mounted on an underside 20 of the semitrailer 16. The rails 18 include a plurality of pin locking holes 22 along the length thereof. The holes 22 are generally spaced 3 to 6 inches apart. A sliding undercarriage, having a general reference numeral 24, is locked to the rails 18 using two or more locking pins 26.

Figure 2:
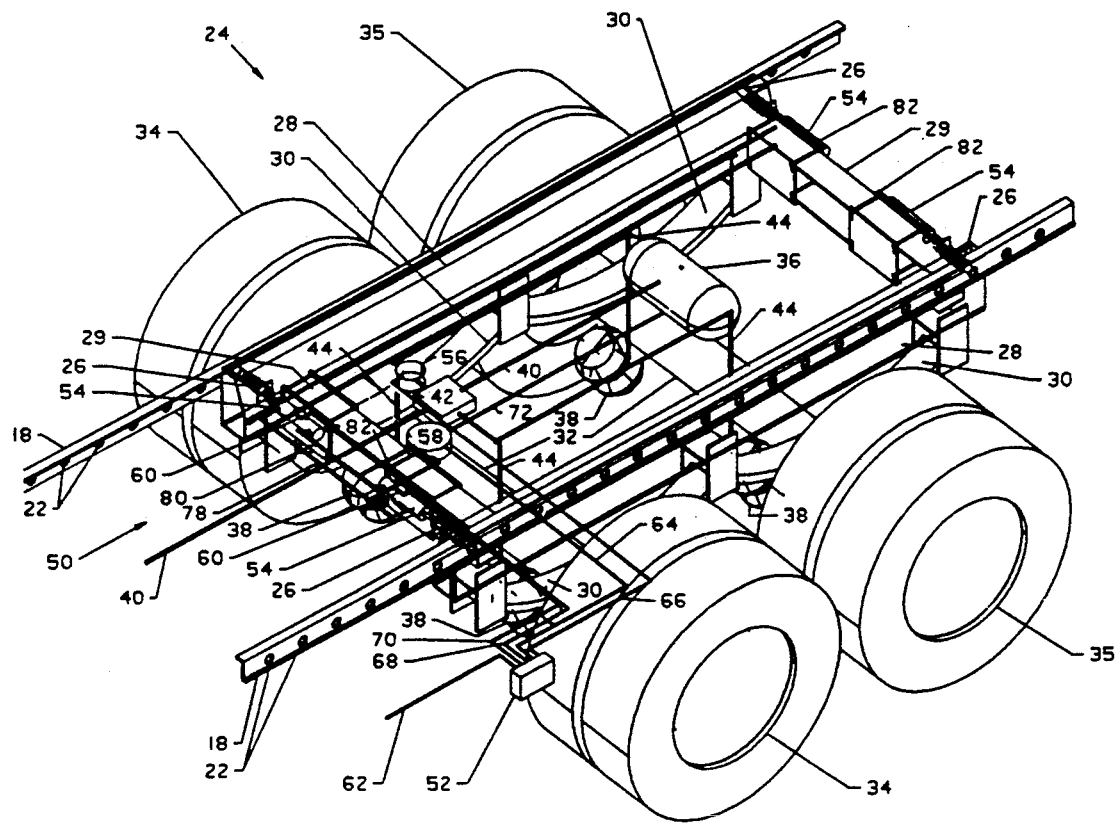
FIG. 2 is a perspective view of the sliding undercarriage mounted on a pair of axles with wheels and shown removed from the underside of the semitrailer.

Referring now to both FIGS. 1 and 2, the sliding undercarriage 24 includes an axle frame 28 with cross members 29, a spring suspension 30 attached to the frame 28, a pair of axles 32 attached to the spring suspension 30 and tandem front wheels 34 and tandem rear wheels 35 mounted on the axles 32. Also, the undercarriage 24 includes a semitrailer supply air tank 36 which supplies compressed air to spring operated air brakes 38. When air pressure is applied to the air brakes 38, the spring bias force in the air brakes is overcome unlocking the braking force on the semitrailer's wheels 34 and 35 and the semitrailer 16 is free to move. When the air pressure is vented or cut off for any reason, the spring bias force of the air brakes 38 is applied and a constant braking force is applied the wheels 34 and 35. The tank 36 receives pressurized air from a tractor air compressor via a supply air line 40. The air compressor is mounted on the tractor 12 and not shown in the drawings. An air brake relay value 42 is mounted on the frame 28 and connected to the air line 40 for directing pressurized air from the air compressor to the supply air tank 36 and from supply air tank 36 to each of the semitrailer's air brakes 38 via air brake lines 44.

Heretofore, the sliding undercarriage 24 was adjusted along the length of the rails 18 using the above mentioned manually operated pin release mechanism which was attached to pins 26 using a linkage system. The prior art pin release mechanism is not shown in the drawings. The manually operated release lever was mounted either in front of the front wheels 34 or between the front wheels 34 and rear wheels 35. The prior art manually operated pin release mechanism is difficult to operate if the semitrailer is parked with a slight twist in the frame, the mechanism is bent or damaged, or one or more pins 26 are stuck inside the locking pin holes 22. Also, it can be appreciated that since the mechanism is next to or between the wheels 34 and 35, the operation of changing the location of the sliding undercarriage 24 manually pulling or lifting the release lever while the driver is moving the tractor to loosen stuck pins is dangerous to the assistant. The subject locking system for a semitrailer sliding undercarriage as described herein provides a reliable system to retract pins and eliminates the use of the manually operated pin release mechanism for greater safety and reliability when adjusting the sliding undercarriage 24.

Referring now to FIG. 2, which is a perspective view of the sliding undercarriage 24, and to FIG. 3, which is a top view of the sliding undercarriage 24, the subject locking system is shown mounted on the undercarriage 24 and having general reference numeral 50. The locking system 50 broadly includes a control panel 52, two or more double acting air cylinders 54 connected to the locking pins 26, an air pressure switch 56, an electric 4-way air valve 58 and locking pin position sensors 60. One of the position sensors 60 is shown clearly in FIG. 4.

In FIGS. 3 and 4, the system's control panel 52 is shown mounted on the left side of the semitrailer 16 and forward of the front wheels 34. The panel 52 can also be mounted in the cab 14 of the tractor 12. The control panel 52 is provided with 12 volt DC electrical power via 2-wire cable 62. The cable 62 is connected to the semitrailer's marker lights. The marker lights, positioned midlength along the bottom of the semitrailer, are not shown in the drawings. The control panel 52 is electrically connected to the electric 4-way air valve 58 via electric 3-wire cable 64 and to the air pressure switch 56 by a 2-wire cable 66. Also, the control panel 52 is electrically connected via electric 3-wire cables 68 and 70 to position sensors 60 mounted on each of the air cylinders 54. One of the cables 70 can be seen attached to a position sensor 60 shown in FIG. 4.

Also in FIGS. 3 and 4, the 4-way electric air valve 58 is connected to the supply air tank 36 by air line 72. The switch 56 is connected in line to the semitrailer's air brake lines 44. Also, the air valve 58 is connected to each of the locking systems air cylinders 54 by way of air lines 78 and 80. The air lines 78 and 80 are clearly shown connected to one of the air cylinders 54 in FIG. 4. It should be noted that depending on the semitrailer manufacturer, the semitrailer 16 with parallel rails 18 may use a pair of locking pins 26 or four locking pins 26. In FIGS. 3 and 4 a second pair of locking pins 26 is connected to air cylinders 54 shown at the rear of the sliding undercarriage 24. For simplicity in describing the subject locking system 50, the air lines and electrical wires to the second pair of air cylinders 54 is not shown or discussed. It can be appreciated that to those skilled in the art of dealing with electrical and air systems used on highway trucks and semitrailers that the hook up of the second pair of air cylinders 54 would be similar as described above.

In FIG. 4 a front view of a portion of the axle frame 28 and one of the cross members 29 is shown. Also, one of the parallel rails 18 is shown in cross section. This drawing view is taken along lines 4—4 shown in FIG. 3. In this view, the air cylinder 54 is secured to the side of the cross member 29 using a mounting bracket 82. The air cylinder 54 is pivotally attached to the mounting bracket 82. The position sensor 60 can be seen secured to the cylinder 54 using an attachment band 84. A piston 86, which is part of the air cylinder 54, is pivotally attached to the locking pin 26 using a swivel type connector 88. The locking pin 26 is attached to the axle frame 28 by a bushing 90 mounted on an angular shaped upper portion 92 of the frame 28. The locking pin 26 includes a coil spring 94 received around a portion of the length of the pin 26 and held in compression between a spring pin 96 mounted on the locking pin 26 and part of the upper portion 92 of the frame 28. The coil spring 94 acts to bias the locking pin 26 toward engagement of a chamfered end 98 of the pin 26 through one of the locking pin holes 22 as shown in this drawing. The air cylinder 54 is shown in this drawing pressurized to force the locking pin 26 into an extended and locked position in one of the pin holes 22 of the rail 18. When the air pressure to the cylinder 54 is reversed, the pin 26 is moved from right to left and in a disengaged position from the rail 18. The sliding undercarriage 24 is now free to be adjusted along the length of the rails 18.

OPERATION OF LOCKING SYSTEM

The operation of the locking system 50 will now be described in conjunction with a discussion of FIG. 5 of the drawings. As background information, it should be mentioned that the electrically operated 4-way air valve 58 receives air pressure from the supply air tank 36 for the operation of the air cylinders 54. The pressure in the semitrailer's air brake system is monitored by the pressure switch 56. It has been found that semitrailer supply air tanks typically have threaded plugs which are provided by the tank manufacturer to allow devices such as an air spring suspension or power lift platform to be added to the semitrailer. Therefore, connecting the 4-way air valve 58 and air cylinders 54 to the semitrailer's air tank 36 and adding air pressure switch 56 for monitoring pressure in the air brake system does not effect the operation of the semitrailer's air brake system. In FIG. 5, a front view of the control panel 52 is shown having an unlock switch 100 and a lock switch 102. When the driver has turned on the truck's marker lights and by pushing the unlock switch 100, 12 volt DC electrical power from electric cable 62 is supplied to electric 4-way air valve 58 via 3-wire electric cable 64. It is important to note at this point the air pressure switch 56 can prevent operation of the electric air valve 58 and is a fail-safe feature of the locking system 50. If the air brake system is pressurized, then the air brakes 38 have been released and therefore the air pressure switch 56 is in a normally open circuit and fail-safe mode and power is interrupted to the electric air valve 58. Air valve 58 in the fail-safe unpowered position provides pressure to the air cylinders 54 to force the locking pins 26 into locked positions. If the semitrailer's air brakes are set by venting the air pressure to the air brakes 38, then the air pressure switch 56 closes the circuit and allows power to be supplied from the control panel 52 for operation of the electric air valve 58.

When the electric air valve 58 has been powered, the valve 58 directs air pressure through air line 78 to the two air cylinders 54 to actuate the cylinders and retract the pistons 86 which in turn retract the locking pins 26 from the parallel rails 18. The air pressure force, over 150 pounds, is sufficient to remove the pins 26 from the rails 18 even though the pins 26 may be stuck inside the locking pin holes 22 of the rails 18. When the cylinders 54 are actuated, the air pressure on the opposite side of the piston 86 is vented through air line 80 and the air valve 58.

The position of the piston 86 in the air cylinder 54 and the locking pins 26 attached to the piston 86 is indicated by position sensor 60. Each position sensor 60 is electrically connected by electric cables 68 and 70 to the control panel 52. When the piston 86 is fully extended and the pins 26 are in a locked position in the locking holes 22, the electronic position sensor 60 is in a normally open mode. The sensor may be a magnetically operated reed switch or similar type electronic position indicator. When the piston 86 is retracted, the position sensor 60 contacts close. Cables 68 and 70 are connected to a warning alarm 104 which is mounted on the control panel 52. When contacts in the position sensor 60 close, the warning alarm 104 is activated and continues until the contacts open after the locking pins 26 have been reinserted into a locked position. Also, the electric cable 70 from the air cylinder's position sensor 60 is wired to pin indicator lights 106, 108, 110 and 112 which are illuminated when 1 or more pins are retracted. The above discussion of the locking system 50 has discussed the wiring of the front two air cylinders 54 mounted on the sliding undercarriage 24. The position sensors 60 on these two air cylinders would, for example, be connected by 3-wire cables 68 and 70 to pin indicator lights 106 and 108 designated as Pin 1 and Pin 2. If the two rear air cylinders 54, shown in FIGS. 2 and 3, were also wired into the control panel 52, then these two cylinder's position sensors 60 would be wired to pin indicator lights 110 and 112 designated as Pin 3 and Pin 4. Under normal operation of the truck 10 with the locking pins 26 fully engaged in the pin locking holes 22 of the rails, the warning alarm 104 and indicator lights 106, 108, 110 and 112 are turned off. When the unlock switch 100 is pressed and the air cylinders 54 are activated and retract the locking pins 26, all of the indicator lights are turned on along with the sound alarm 104 being activated.

When the locking pins 26 have been removed from the parallel rails 18, the semitrailer 16 is now ready to be repositioned on the sliding undercarriage 24. After the driver has properly repositioned the semitrailer 16 at a new location on top of the sliding undercarriage 24, the lock switch 102 on the control panel is then pushed. The electrical power is now removed to the electric 4-way air valve 58. At this time, the air valve 58 directs air pressure through air line 80 to the air cylinders 54 which in turn extends the pistons 86 outwardly and the locking pins 26 are inserted into newly selected locking pin holes 22 on the rails 18. Air pressure on the opposite side of the pistons 86 is now vented through air line 78 and the air valve 58. Also, the above reinsertion of the locking pins 26 into newly selected pin holes 22 can also be accomplished by the driver of the truck 10 pressurizing the semitrailer's air brakes 38 to release the brakes. At this time the air pressure switch 56 senses the increase in air pressure and opens the circuit to interrupt the electric power to the air valve 58 and air valve 58 returns to a fail-safe open circuit mode. Automatically, air pressure is directed through the air valve 58 and air line 80 to extend the pistons 86 of the cylinders 54 for extending the locking pins 26 into a locked position. When the locking pins 26 are returned into a locked position in the newly selected locking pin holes 22, electronic position sensor 60 contacts open which through electric cables 68, 70 to the control panel 52, turn off the warning alarm 104 and the pin indicator lights 106 and 108.

If all of the locking pins 26 are not fully inserted into the locking pin holes 22 and the sound alarm 104 continues along with one or more of the pin indicator light remaining lighted, the driver of the truck 10 can set the semitrailer 16 spring brakes 38 and slide the semitrailer 16 over the undercarriage 24. By moving the semitrailer forward or backward a few inches, one or more of the locking pins 26, which are not fully extended, will then extend through the first pin holes 22 which move into alignment. The sound alarm 104 will then shut off and the indicator lights that were illuminated now turn off. Upon completion of the changing of the position of the semitrailer 16 on the sliding undercarriage 24 using the subject fail-safe locking system 50, if the semitrailer's air brakes 38 are still set, air pressure can now be applied to the air brakes 38 by the truck's driver to release the brakes. The tractor 12 and semitrailer 16 are now ready for being driven safely on the highway.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A locking system for mounting on a sliding undercarriage of a semitrailer, the semitrailer pulled by a tractor, the locking system used for securing and releasing the sliding undercarriage from a pair of parallel rails mounted on an underside of the semitrailer, the parallel rails having spaced apart locking pin holes along the length thereof, the sliding undercarriage having spring operated air brakes operated from a pressurized air source on the semitrailer or tractor, the semitrailer having an electrical power source thereto, the locking system comprising:
   a pair of locking pins;
   locking pin insertion and retraction means attached to each of said locking pins for inserting and retracting said locking pins in selected locking pin holes in the parallel rails, said insertion and retraction means attached to the sliding undercarriage;
   means for allowing retracting of each of said locking pins from the locking pin holes only when the semitrailer brakes on the sliding undercarriage are set, said means for allowing retracting of each of said locking pins connected to said insertion and retraction means; and
   individual pin indicator means connected to said locking pin insertion and retraction means for indicating when each of said pins are properly extended into a locked position in the locking pin holes in the rails.

2. The locking system as described in claim 1 wherein said individual pin indicator means indicates when each of said pins are properly retracted from the locking pin holes in the rails.

3. The locking system as described in claim 1 wherein said locking pin insertion and retraction means is a pair of air cylinders with pistons, each of said air cylinders mounted on the sliding undercarriage, each of said pistons attached to said locking pins.

4. The locking system as described in claim 3 wherein said indicator means includes an electronic position indicator mounted on each of said air cylinders, said electronic position indicators electrically connected to a control panel and electrical power source, said control panel providing a visual or audio display when each of said locking pins are properly extended into a locked position in selected locking pin holes in the rails and when each of said locking pins are properly retracted from the locking pin holes.

5. The locking system as described in claim 4 wherein said electronic position indicators are magnetically operated reed switches.

6. A locking system for mounting on a sliding undercarriage of a semitrailer, the semitrailer pulled by a tractor, the locking system used for securing and releasing the sliding undercarriage from a pair of parallel rails mounted on an underside of the semitrailer, the parallel rails having spaced apart locking pin holes along the length thereof, the sliding undercarriage having spring operated air brakes operated from a pressurized air source on the semitrailer or tractor, the semitrailer having an electrical power source thereto, the locking system comprising:
   a pair of double acting air cylinders with pistons, said air cylinders mounted on the sliding undercarriage and disposed next to the parallel rails;
   locking pins attached to said pistons, a portion of said locking pins inserted into selected locking pins holes in the parallel rails;
   an air pressure switch connected to said air cylinders for allowing operation of said air cylinders and the retracting of said locking pins for the locking pin holes only when air pressure is released to the semitrailer air brakes and the semitrailer brakes are set on the sliding undercarriage; and
   an electrically operated 4-way air valve connected to said air cylinders and the pressurized air source on the semitrailer or trailer, said 4-way air valve also connected electrically to the semitrailer's electrical power source and connected to said air pressure switch, said 4-way air valve directing pressurized air to said air cylinders for retracting and extending the pistons in said cylinders, said air pressure switch sensing pressurization or release of air pressure to the semitrailer's air brakes, wherein said air pressure switch and said 4-way air valve are electrically connected to an unlock switch on a control panel mounted on the semitrailer or tractor, said air pressure switch electrically preventing the retracting of said locking pins from the locking pin holes when turning said unlock switch on, if there is an electrical power interruption to the electrical power source on the semitrailer.

7. The locking system as described in claim 6 further including electronic position indicators mounted on each of said air cylinders for indicating when said locking pins are properly extended into a locked position in the locking pin holes in the rails and for indicating when said locking pins are retracted from the locking pin holes in the rails.

8. The locking system as described in claim 7 wherein said position indicators are electrically connected to a control panel mounted on the semitrailer or trailer, said control panel providing a visual or audio display when said locking pins are properly extended into a locked position in selected locking pin holes in the rails and when said locking pins are retracted from the locking pin holes, said control panel electrically connected to the semitrailer's electrical power source.

9. The locking system as described in claim 6 wherein said control panel includes a lock switch electrically connected to said air pressure switch and said 4-way air valve, said lock switch when turned on electrically signaling said 4-way air valve for directing pressurized air to said air cylinders and extending said pistons and inserting said locking pins in selected locking pin holes.

10. The locking system as described in claim 6 wherein said air pressure switch is normally in an open circuit mode and electrical power is interrupted to said 4-way air valve.

11. The locking system as described in claim 10 wherein when electrical power is interrupted to said 4-way air valve, said 4-way air valve provides air pressure to said air cylinders for forcing said locking pins into a locked position in the locking pin holes.

12. The locking system as described in claim 11 wherein when electrical power is applied to said 4-way air valve for retracting said locking pins and said air pressure switch senses an increase in air pressure to the semitrailer's air brakes, the air pressure switch interrupts electrical power to said 4-way air valve and said 4-way air valve provides air pressure to said air cylinders for reversing the pistons and forcing said locking pins into a locked position in the locking pin holes.

13. A locking system for mounting on a sliding undercarriage of a semitrailer, the semitrailer pulled by a tractor, the locking system used for securing and releasing the sliding undercarriage from a pair of parallel rails mounted on an underside of the semitrailer, the parallel rails having spaced apart locking pin holes along the length thereof, the sliding undercarriage having semitrailer spring operated air brakes operated from a pressurized air source on the semitrailer or tractor, the semitrailer having an electrical power source thereto, the locking system comprising:

a pair of air cylinders with pistons, said air cylinders mounted on the sliding undercarriage and disposed next to the parallel rails;

locking pins attached to said pistons, a portion of said locking pins inserted into selected locking pin holes in the parallel rails;

an electrically operated air valve connected to said air cylinders and the pressurized air source on the semitrailer or trailer said air valve also connected electrically to the semitrailer's electrical power source, said air valve directing pressurized air to said air cylinders for retracting and extending the pistons in said cylinders;

a fail safe electrically operated air pressure switch, said air pressure switch electrically connected to the semitrailer's electrical power source and connected to the semitrailer's pressurized air source, said air pressure switch electrically interlocked with said air valve for automatically controlling the operation of opening and closing of said air valve during the retracting of said locking pins for the locking pin holes and allowing pin retraction only when air pressure is released to the semitrailer air brakes and the semitrailer air brakes are set on the sliding undercarriage, said air pressure switch sensing pressurization or release of air pressure to the semitrailer's air brakes.

14. The locking system as described in claim 13 wherein said electrically operated air pressure switch and said air valve are electrically connected to an unlock switch on a control panel mounted on the semitrailer or tractor, said air pressure switch automatically preventing said air valve from retracting said locking pins for the locking pin holes when turning said unlock switch "on" if there is an electrical power interruption to the electrical power source on the semitrailer.

15. The locking system as described in claim 13 wherein said electrically operated air pressure switch and said air valve are electrically connected to an unlock switch on a control panel mounted on the semitrailer or tractor, said air pressure switch automatically preventing said air valve from retracting said locking pins from the locking pin holes when turning said unlock switch "on" if air pressure has not been released to the semitrailer air brakes and if the semitrailer brakes are not set on the sliding undercarriage.

16. The locking system as described in claim 13 wherein said electrically operated air pressure switch and said air valve are electrically connected to a lock switch on a control panel mounted on the semitrailer or tractor, said air valve directing pressurized air to said air cylinders for extending said locking pins from a retracted position to an extended position in the locking pin holes when turning said lock switch "on".

17. The locking system as described in claim 13 wherein said air pressure switch electrically connected to said air valve controls the operation of said air valve, when said locking pins have been retracted, for extending said locking pins automatically into the locking pin holes when air pressure is applied when releasing the semitrailer air brakes.

18. The locking system as described in claim 13 wherein said air cylinders are double acting air cylinders and said air valve is a 4-way air valve.

* * * * *